April 28, 1959

W. T. EVANS 2,884,194

ANALOG COMPUTER TO DETERMINE SEISMIC
WEATHERING TIME CORRECTIONS

Filed Oct. 15, 1953

INVENTOR.
WILLIAM T. EVANS

BY

*Busser, Smith & Harding*

ATTORNEYS

United States Patent Office 2,884,194
Patented Apr. 28, 1959

2,884,194
ANALOG COMPUTER TO DETERMINE SEISMIC WEATHERING TIME CORRECTIONS

William T. Evans, Beaumont, Tex., assignor to Sun Oil Company, Philadelphia, Pa., a corporation of New Jersey Application October 15, 1953, Serial No. 386,207

4 Claims. (Cl. 235—185)

This invention relates to analog computers and, more particularly, to an analog computer for use in computing seismic weathering corrections.

As is well known in the art of seismic surveying, in working with seismic records it is necessary to make numerous corrections for the condition of the weathered layer of the surface of the earth. These computations require considerable time when done by numerical methods.

It is an object of this invention to provide an analog computer capable of solving an equation which is hereinafter set forth, the solution of which provides the desired weathering correction in milliseconds.

The invention is not thus limited however. While it is generally the practice in analog circuits to add potentials in order to solve an equation, in the present analog currents are added to provide a solution and the analog computer is based on an analogy of current for time, resistance for velocity and voltage for distance.

Figure 1:
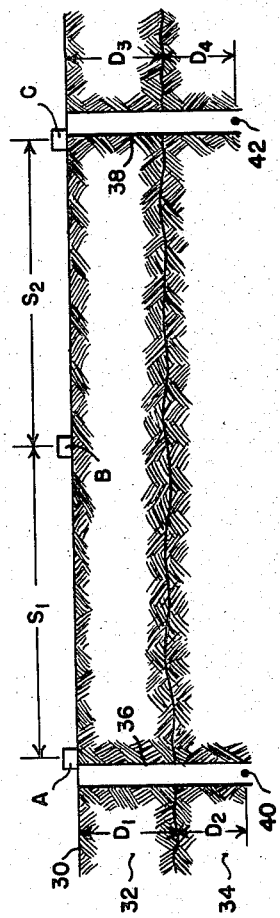
Figure 2:
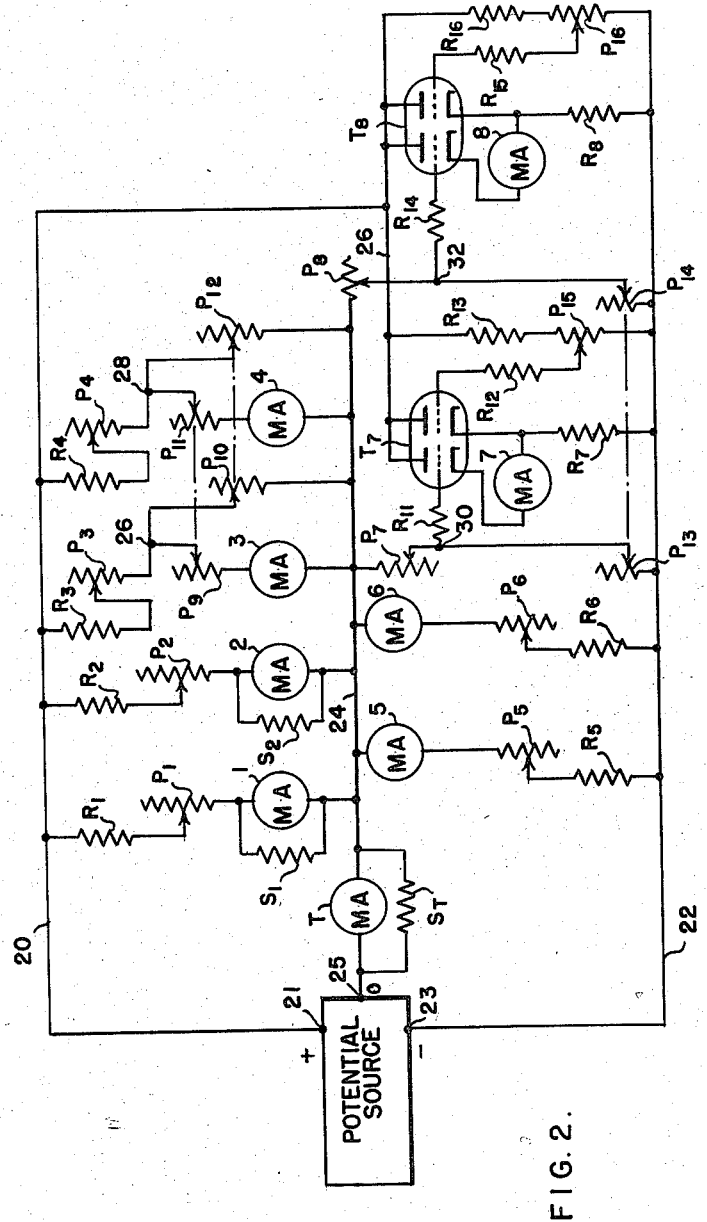

These and other objects of the invention will become apparent from the following description when read in conjunction with the accompanying drawings, in which:

Figure 1 is a section through the surface of the earth showing shot holes and detectors to which reference will be made in the weathering correction equation; and Figure 2 is a circuit diagram of the computer.

The analog computer is designed to solve an equation which provides the desired weathering correction in milliseconds. It is believed unnecessary to set forth the derivation of this equation. For purposes of this invention, it is sufficient that this equation be set forth as an example of the type of equation that can be solved by the computer. It will be apparent that the computer is not limited in its application to the solution of this one equation only; the principles set forth have broad application in computer circuits in which variables are involved in a relationship $$I = \frac{E}{R}$$

and in which the I's are to be algebraically summed.

Reference to Figure 1 will make clear in a general way the various terms in the equation to be solved. In Figure 1 there is indicated the surface of the earth 30 below which is the weathered layer 32 which is a shallow zone near the earth's surface in which seismic velocities are abnormally low. The layer 34 is the higher velocity zone lying immediately below the weathered layer 32. Through the first layer and into the second are bored two spaced holes 36 and 38. In the bottoms of these holes there are placed explosive charges indicated at 40 and 42, respectively. Three detectors, indicated at A, B and C are positioned at the surface of the earth, detector A being at the top of the bore hole 36, detector C being at the top of bore hole 38 and detector B being spaced between the bore holes by distances indicated at S1 and S2. The depth of the weathered layer at hole 36 is indicated at $D_1$ and the depth of the charge in this hole below the weathered layer is indicated at $D_2$. Similarly, at hole 38 the depth of the weathered layer is indicated at $D_3$ and the depth of the charge below the weathered layer is indicated at $D_4$. The velocity of the wave propagation through the weathered layer 32 is $V_1$ and the velocity of wave propagation through the high velocity unweathered layer 34 is $V_2$.

The weathering correction equation is:

$$4T_{wb} = 2T_{AB} + 2T_{CB} + T_{UP1}\frac{V_2}{V_2 - V_1} + T_{UP2}\frac{V_2}{V_2 - V_1} \\ - T_{AC} - T_{CA} - \frac{D_{S1}}{V_2 - V_1} - \frac{D_{S2}}{V_2 - V_1} \quad (1)$$

where:

$T_{WB}$ is the desired weathering correction in milliseconds;
$T_{AB}$ is the travel time in milliseconds of waves from the shot point 40 to detector B;
$T_{CB}$ is the travel time in milliseconds of waves from the shot point 42 to detector B;
$T_{UP1}$ is the up hole wave travel time in milliseconds in hole 36;
$T_{UP2}$ is the up hole wave travel time in milliseconds in hole 38;
$T_{AC}$ is the wave travel time in milliseconds from the shot 40 to detector C;
$T_{CA}$ is the wave travel time in milliseconds from the shot 42 to detector A;

$$\frac{D_{S1}}{V_2 - V_1}$$

is the depth of the shot in hole 36 in feet divided by the wave velocity through the high speed layer minus the wave velocity through the weathered layer, $D_{S1}$ being $D_1 + D_2$; and $$\frac{D_{S2}}{V_2 - V_1}$$

is the depth of the shot in hole 38 in feet divided by the wave velocity through the high speed layer minus the wave velocity through the weathered layer, $D_{S2}$ being $D_3 + D_4$.

It will be evident that each of the terms of this equation are time values and thus an analog may be established employing current for time, resistance for velocity and voltage for distance. Equation 1 now becomes, in terms of the analogy:

$$I_T = I_1 + I_2 + I_3 + I_4 - I_5 - I_6 - I_7 - I_8 \quad (2)$$

The circuit diagram of the computing instrument is shown in Figure 2. The meters 1—4, 7, 8 and T are all 0 to 1 milliammeters. The meters 5 and 6 are 0 to 5 milliammeters. The meters 2, 5 and 6 are provided with 0 to 500 millisecond scales, and meters 3 and 4 are provided with 0 to 1 millisecond scales, and meters 7 and 8 are provided with scales calibrated in feet. These meters measure the currents in the various legs of the circuit as will be described and correspond to the readings $I_1$ to $I_8$ and $I_T$ in Equation (2).

The computer comprises a plurality of legs connected between either conductor 20 or conductor 22 and a neutral conductor 24. The conductor 20 is connected to a suitable regulated source of positive potential at 21 and the conductor 22 is connected to a suitable source of negative potential at 23. The conductor 24 is connected through milliammeter T to a neutral (zero potential) terminal 25. An algebraic summation of the currents passing through the various legs of the computer will be read on the milliammeter T which represents the desired weathering correction in milliseconds as indicated by the expression $T_{WB}$ in the Equation 1.

The first leg of the computer, which is equivalent to the expression $T_{AB}$ of Equation 1, contains the milliammeter 1, a variable resistance P1 and a fixed resistance R1 connected in series across lines 20 and 24. The resistance R1 is a current limiting resistance, and the variable resistance P1 is employed to adjust the current flowing through the milliammeter 1 to a value which will read on the milliammeter scale the number of milliseconds represented by the expression $T_{AB}$ for any particular earth condition. The meter shunt S1 is chosen so that, when the meter reads the proper number of milliseconds, the total current through the leg is $I_1=2T_{AB}$.

The second leg of the computer, which is equivalent to the expression $T_{CB}$ of Equation 1, contains the milliammeter 2, a variable resistance P2 and a fixed resistance R2 connected in series. The expression $T_{CB}$ is set on the milliammeter 2 in the same fashion as the setting of 1. The meter shunt S2 is chosen so that, when the meter reads the proper number of milliseconds, the total current through the leg is $I_2=2T_{CB}$. It is noted that both the expressions $T_{AB}$ and $T_{CB}$ are positive expressions, and thus the currents $I_1$ and $I_2$ are positive currents flowing between the positive potential conductor 20 and the neutral line 24, and returning in a positive direction through meter T to the zero terminal 25.

The negative expressions $T_{AC}$ and $T_{CA}$, which are represented by currents $I_5$ and $I_6$, are set up between the negative potential conductor 22 and the neutral conductor 24. The expression $T_{AC}$ is set on milliammeter 5 which is connected in series with variable resistance P5 and fixed resistance R5 across conductors 22 and 24 as previously noted. The expression $T_{CA}$ is set on milliammeter 6 which is connected in series with variable resistance P6 and fixed resistance R6 across conductors 22 and 24.

The third leg of the computer includes milliammeter 3 connected in series with fixed resistance R3, variable resistance P3 and variable resistance P9 between conductors 20 and 24. The variable resistance P9 is set to a value corresponding to $V_1$ and then the resistance P3 is adjusted to cause the meter 3 to read, in milliseconds, the value $T_{UP1}$. Under this condition the current through the meter is equal to $T_{UP1}$. The meter resistance is negligible compared to the value $V_1$. Thus the voltage between point 26 (between P3 and P9) and conductor 24 is equal to $(T_{UP1})(V_1)$. This same voltage is applied across a parallel branch consisting of variable resistance P10 which is set to a value $P10=V_2-V_1$. The current through P10, then, is $$\frac{(T_{UP1})(V_1)}{V_2-V_1}$$

and the total current in the two parallel branches extending between point 26 and conductor 24 is $$T_{UP1}+\frac{(T_{UP1})(V_1)}{V_2-V_1}=\frac{(T_{UP1})(V_2)}{V_2-V_1}=I_3$$

The fourth leg includes a milliammeter 4 in series with a variable resistance P11, a second variable resistance P4 and a fixed resistance R4 connected between conductors 20 and 24. A variable resistance P12 is connected in parallel with the meter 4 and the variable resistance P11 between point 28 and the conductor 24.

This leg carrying the current $I_4$ is adjusted in a similar fashion to the adjustment of the leg carrying the current $I_3$ so that the meter 4 will read the value $T_{UP2}$. The variable resistance P11 is set to correspond to the value $V_1$ and the variable resistance P12 is set to correspond to the value $V_2-V_1$. Thus the current through the parallel branches extending between point 28 and the conductor 24 is equal to $I_4$.

Leg 7 of the computer circuit is for the term of the equation containing the expression $D_{S1}$. This leg includes a variable resistance P7 connected in series with the variable resistance P13 between the negative conductor 22 and the conductor 24. The variable resistance P13 is set according to the value $V_2-V_1$. The variable resistance P7 is thereafter adjusted so that the voltage across P13 is equal to $D_{S1}$. Then the current through P13 must be equal to $$\frac{D_{S1}}{V_2-V_1}$$

The voltage across P13, i.e., the voltage appearing between point 30 and conductor 22, is measured by means of a vacuum tube voltmeter arrangement in the form of a twin triode T7 and the meter 7 which is calibrated in feet. The grid of the left-hand triode of tube T7 is connected through grid resistor R11 to point 30. A change in the voltage at the left-hand grid of tube T7 will change the cathode current in the same direction and the changes will be linearly proportional over a limited range. To secure the desired condition of indication on the calibrated scale of meter 7 of the potential at 30 (corresponding to feet), despite variations in the characteristics of the left-hand triode, the right-hand triode of tube T7 is provided with its cathode connected to the upper end of the common cathode resistor R7 and an adjustable current is provided through R7 from this right-hand triode by adjustment of potentiometer P15 connected to its grid through resistor R12. This provides the desired initial adjustment. Resistor R13 is provided to permit the use of a potentiometer P15 which has greater sensitivity. The plates of the tube T7 are connected through conductor 26 to the positive potential conductor 20. Thus the current flow through the voltmeter circuit does not affect the current flow through the neutral conductor 24 and, therefore, does not affect the current summations being measured. It will be evident that numerous other vacuum tube voltmeter circuits may be employed in place of the specific arrangement shown.

Leg 8 of the circuit includes a variable resistance P8 connected in series with the variable resistance P14 between the negative conductor 22 and the neutral conductor 24. The value of $D_{S2}$ is set up in leg 8 so as to provide a voltage drop across P14 between point 32 and the negative conductor 22 which is measured by the vacuum tube voltmeter arrangement of the twin triode T8, milliammeter 8 and resistors R15 and 16 and potentiometer P16. In this leg the variable resistance P14 is set according to the value $V_2-V_1$ and P8 is thereafter adjusted so that the voltage across P14 is equal to $D_{S2}$. The current through P14 then is equal to $$\frac{D_{S2}}{V_2-V_1}$$

The plates of the twin triode T8 are also connected through line 26 to the positive potential conductor 20. Thus the current drawn by this voltmeter circuit has no effect on the result of the current summation in the neutral conductor 24.

The potentiometers P9 and P11, which are adjusted to correspond to the value $V_1$, and the potentiometers P10, P12, P13 and P14, which are adjustable to correspond to the value $V_2-V_1$, may be mechanically set up in ganged relation so as to be simultaneously positioned by one control which sets P9 and P11 for the value of $V_1$ and by another control which sets P10, P12, P13 and P14 for the value of $V_2-V_1$. This subtraction is readily accomplished mentally and, thus, the setting of these values is relatively simple.

When all of the values have been set into the computer, the resultant current in the common line 24 passing to the milliammeter T is $I_T=4T_{WB}$. Milliammeter T is shunted by means of $S_T$ to read one-quarter the total current or $T_{WB}$. This reading is, of course, the desired weathering correction and may be read directly if the milliammeter T is calibrated in milliseconds.

It will be evident that, while the computer is described in connection with the solution of a specific equation, the method involved and the circuits disclosed are not limited to this specific equation. The analog may be employed in the investigation of any problem involving time, distance and velocity, and the analog may also be employed wherever currents, resistances and potentials may represent the various expressions in an equation to be solved and the summation desired is of a variable represented by the sum of currents. It will be evident that various modifications may be made in the embodiment of the invention disclosed herein to suit particular problems without departing from the scope of the invention as set forth in the following claims.

What is claimed is:

1. An analog computer for computing seismic weathering corrections comprising an electrical circuit including means providing a source of current at positive potential, a source of current at negative potential and a zero potential connection, a meter for measuring current representative of time, one side of said meter being connected to said zero potential connection, and a network connected to the other side of said meter and connected to said first and second mentioned current sources, said network including a second meter for measuring current representative of time, a variable resistance in series with said second meter for adjusting the current measured by said second meter, said last mentioned series arrangement being connected between one of said current sources and said other side of said first mentioned meter, and a second variable resistance representative of velocity in series with a third meter for measuring current representative of time, a third variable resistance representative of velocity in parallel with said third meter and said second variable resistance and a fourth variable resistance in series with said parallel arrangement for adjusting the current measured by said third meter, said last mentioned series-parallel arrangement being connected between the other of said current sources and said other side of said first mentioned meter, whereby upon proper adjustment of said variable resistances the current through said first mentioned meter is indicative of a resultant seismic weathering time correction.

2. An analog computer for computing seismic weathering corrections comprising an electrical circuit including means providing a source of current at positive potential, a source of current at negative potential and a zero potential connection, a meter for measuring current representative of time, one side of said meter being connected to said zero potential connection, and a network connected to the other side of said meter and connected to said first and second mentioned current sources, said network including a second meter for measuring current representative of time, a variable resistance in series with said second meter for adjusting the current measured by said second meter, said last mentioned series arrangement being connected between one of said current sources and said other side of said first mentioned meter, and a second variable resistance representative of velocity, means for measuring voltage representative of distance in parallel with said second variable resistance and a third variable resistance in series with said parallel arrangement for adjusting the voltage measured by said measuring means, said last mentioned series-parallel arrangement being connected between the other of said current sources and the other side of said first mentioned meter, whereby upon proper adjustment of said variable resistances the current through said first mentioned meter is indicative of a resistant seismic weathering time correction.

3. An analog computer for computing seismic weathering corrections comprising an electrical circuit including means providing a source of current at positive potential, a source of current at negative potential and a zero potential connection, a meter for measuring current representative of time, one side of said meter being connected to said zero potential connection, and a network connected to the other side of said meter and connected to said first and second mentioned current sources, said network including a first variable resistance representative of velocity, means for measuring voltage representative of distance in parallel with said variable resistance and a second resistance in series with said parallel arrangement for adjusting the voltage measured by said measuring means, said series-parallel arrangement being connected between one of said current sources and said other side of said first mentioned meter, and a third variable resistance representative of velocity in series with a second meter for measuring current representative of time, a fourth variable resistance representative of velocity in parallel with said second meter and said third variable resistance and a fifth variable resistance in series with said parallel arrangement for adjusting the current measured by said second meter, said last mentioned series-parallel arrangement being connected between the other of said current sources and said other side of said first mentioned meter, whereby upon proper adjustment of said variable resistances the current through said first mentioned meter is indicative of a resultant seismic weathering time correction.

4. An analog computer for computing seismic weathering corrections comprising an electrical circuit including means providing a source of current at positive potential, a source of current at negative potential and a zero potential connection, a meter for measuring current representative of time, one side of said meter being connected to said zero potential connection, and a network connected to the other side of said meter and connected to said first and second mentioned current sources, said network including a second meter for measuring current representative of time, a variable resistance in series with said second meter for adjusting the current measured by said second meter, said last mentioned series arrangement being connected between one of said current sources and said other side of said first mentioned meter, and a second variable resistance representative of velocity in series with a third meter for measuring current representative of time, a third variable resistance representative of velocity in parallel with said third meter and said second variable resistance and a fourth variable resistance in series with said parallel arrangement for adjusting the current measured by said third meter, said last mentioned series-parallel arrangement being connected between said one of said current sources and said other side of said first mentioned meter, and said network also including a fourth meter for measuring current representative of time, a fifth variable resistance in series with said fourth meter for adjusting the current measured by said fourth meter, said last mentioned series arrangement being connected between the other of said current sources and said other side of said first mentioned meter, and a sixth variable resistance representative of velocity, means for measuring voltage representative of distance in parallel with said sixth variable resistance and a seventh variable resistance in series with said parallel arrangement for adjusting the voltage measured by said measuring means, said last mentioned series-parallel arrangement being connected between said other of said current sources and said other side of said first mentioned meter, whereby upon proper adjustment of said variable resistances the current through said first mentioned meter is indicative of a resultant seismic weathering time correction.

References Cited in the file of this patent

UNITED STATES PATENTS

| | | |
|---|---|---|
| 2,468,150 | Wilcox | Apr. 26, 1949 |
| 2,603,415 | Silverman et al. | July 15, 1952 |
| 2,630,968 | Muskat | Mar. 10, 1953 |

FOREIGN PATENTS

| | | |
|---|---|---|
| 737,888 | Germany | June 24, 1943 |
| 668,384 | Great Britain | Mar. 19, 1952 |

OTHER REFERENCES

Electrical Communications Experiments (Reed et al.) 1952, page 32.